United States Patent [19]

Freeburger

[11] Patent Number: 5,220,857
[45] Date of Patent: Jun. 22, 1993

[54] MITER SAW APPARATUS

[76] Inventor: Barron D. Freeburger, 12607 Jolly Pl., Chester, Va. 23831

[21] Appl. No.: 797,418

[22] Filed: Nov. 21, 1991

[51] Int. Cl.[5] .............................................. B27B 5/20
[52] U.S. Cl. .................. 83/468.3; 83/471.3; 83/477.1; 83/477.2; 83/486.1
[58] Field of Search ............... 83/471.3, 471.2, 477.1, 83/477.2, 473, 485, 486.1, 489, 574, 468.3; 184/28, 38.1

[56] References Cited

U.S. PATENT DOCUMENTS

| | | | |
|---|---|---|---|
| 3,302,669 | 2/1967 | Edler | 83/471.3 |
| 4,265,154 | 5/1981 | Batson | 83/468 |
| 4,869,142 | 9/1989 | Sato et al. | 83/490 |
| 4,874,025 | 10/1989 | Cleveland | 83/648 |
| 4,934,423 | 6/1990 | Withrow | 83/468.3 |
| 5,054,352 | 10/1991 | Fushiya et al. | 83/490 |

Primary Examiner—Douglas D. Watts
Assistant Examiner—Allan M. Schrock
Attorney, Agent, or Firm—Leon Gilden

[57] ABSTRACT

The miter box arrangement includes a central rotary saw table mounted medially of a base plate, wherein the saw table is rotatably through a forty-five degree arc and wherein an associated fence is rotatable through a forty-five degree arc to permit cutting of various angles between zero and ninety degrees relative to an associated saw blade.

2 Claims, 4 Drawing Sheets

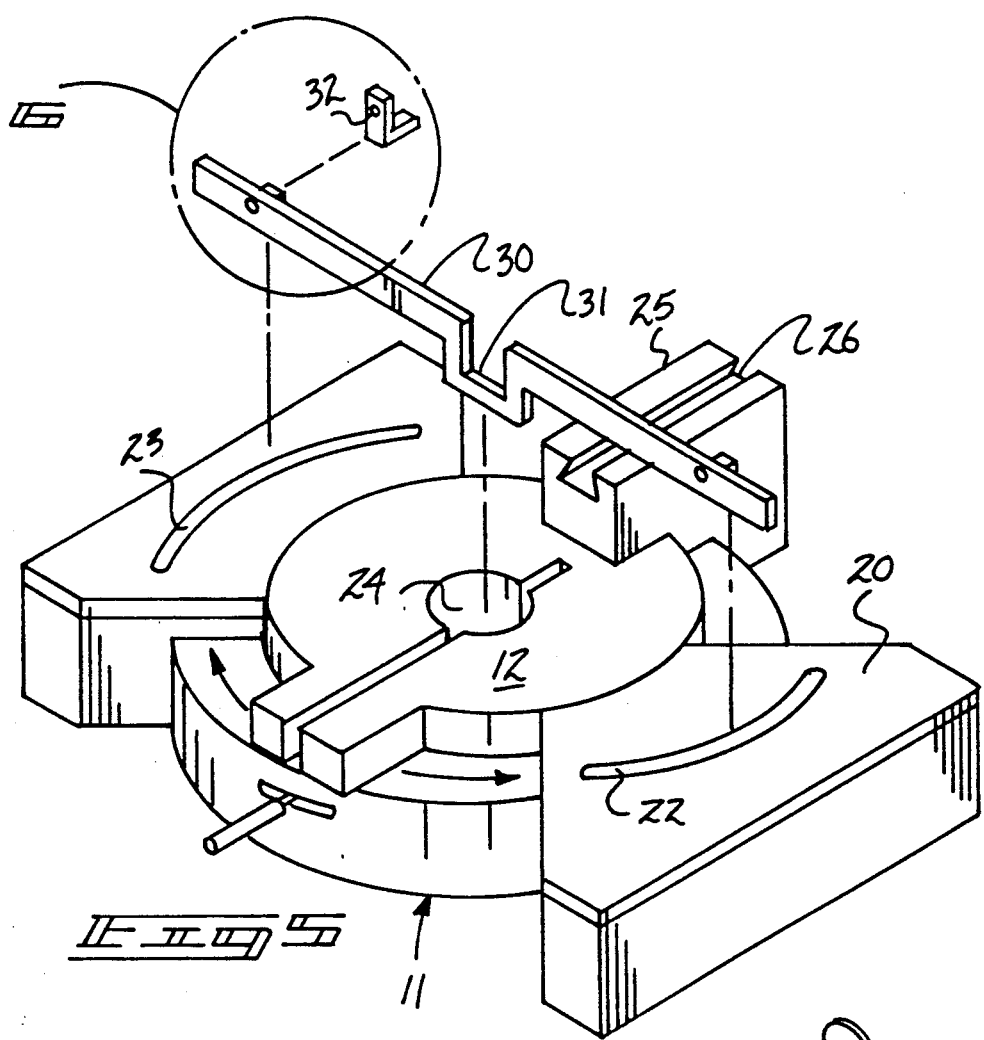
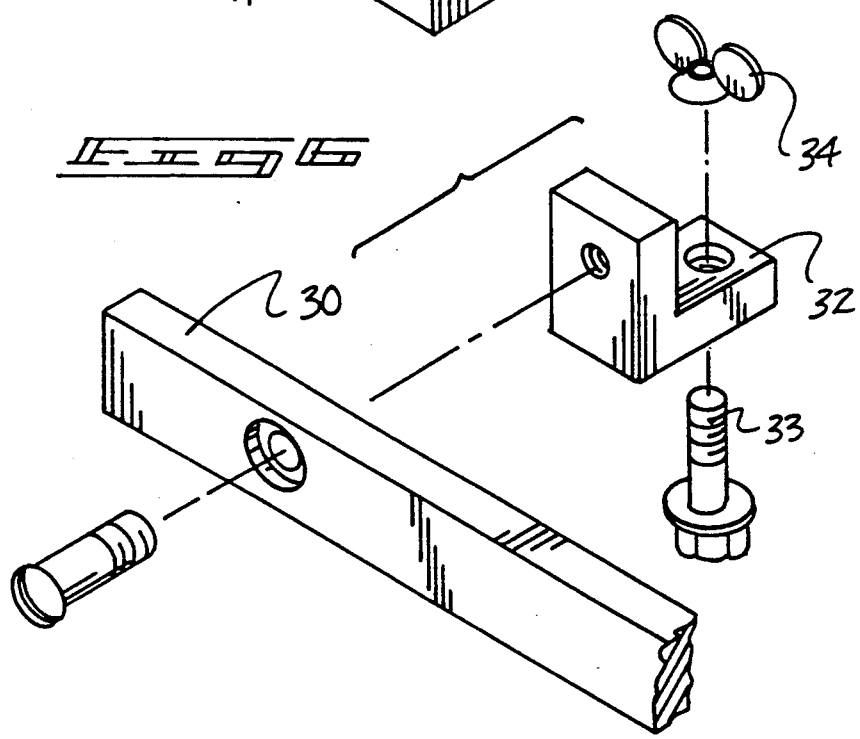

MITER SAW APPARATUS

BACKGROUND OF THE INVENTION

1. Field of the Invention

The field of invention relates to saw apparatus, and more particularly pertains to a new and improved miter saw apparatus wherein the same is arranged for the cutting of a workpiece directed along a fence relative to a rotary saw blade.

2. Description of the Prior Art

Various commercially available saws to include "chop saws", as well as various miter box arrangements are available throughout the prior art. Such saw structure is exemplified in the U.S. Pat. No. 4,874,025 to Cleveland wherein a utility stand includes a centrally oriented recess relative to wing structure to permit the mounting of a saw medially of the wing structure.

U.S. Pat. No. 4,934,233 to Brundage, et al. sets forth a compound miter saw that is pivotally mounted relative to an underlying saw table.

U.S. Pat. No. 4,265,154 to Batson sets forth a miter saw fence mounted relative to a rotary saw structure.

As such, it may be appreciated that there continues to be a need for a new and improved miter saw apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of miter apparatus now present in the prior art, the present invention provides a miter saw apparatus wherein the same is arranged for the angular cutting relative to an elongate workpiece. As such, the general purpose of the present invention, which will be described subsequently in greater detail, is to provide a new and improved miter saw apparatus which has all the advantages of the prior art miter saw apparatus and none of the disadvantages.

To attain this, the present invention provides a miter box arrangement including a central rotary saw table mounted medially of a base plate, wherein the saw table is rotatable through a forty-five degree arc and wherein an associated fence is rotatable through a forty-five degree of arc to permit cutting of various angles between zero and ninety degrees relative to an associated saw blade.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved miter saw apparatus which has all the advantages of the prior art miter saw apparatus and none of the disadvantages.

It is another object of the present invention to provide a new and improved miter saw apparatus which may be easily and efficiently manufactured and marketed.

It is a further object of the present invention to provide a new and improved miter saw apparatus which is of a durable and reliable construction.

An even further object of the present invention is to provide a new and improved miter saw apparatus which is susceptible of a low cost of manufacture with regard to both materials and labor, and which accordingly is then susceptible of low prices of sale to the consuming public, thereby making such miter saw apparatus economically available to the buying public.

Still yet another object of the present invention is to provide a new and improved miter saw apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of the saw fence mounted to the saw table structure.

FIG. 6 is an isometric enlarged illustration of section 6 as set forth in FIG. 5.

DESCRIPTION OF THE PREFERRED EMBODIMENT

Figure 1:
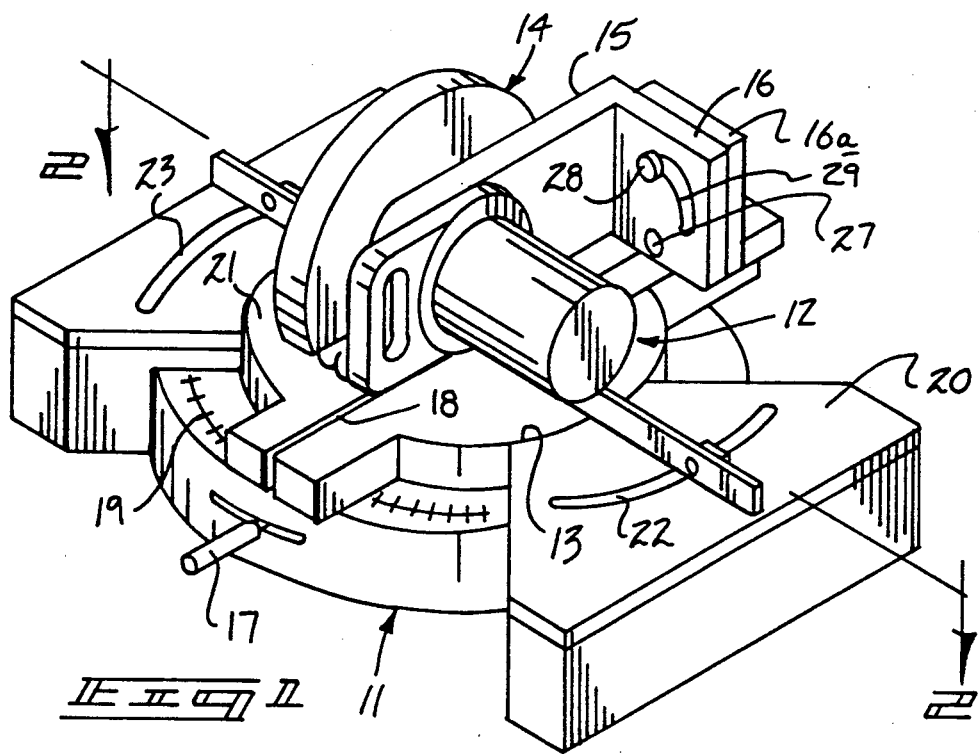
FIG. 1 is an isometric illustration of the instant invention.

With reference now to the drawings, and in particular to FIGS. 1 to 8 thereof, a new and improved miter saw apparatus embodying the principles and concepts of the present invention and generally designated by the reference numeral 10 will be described.

Figure 2:
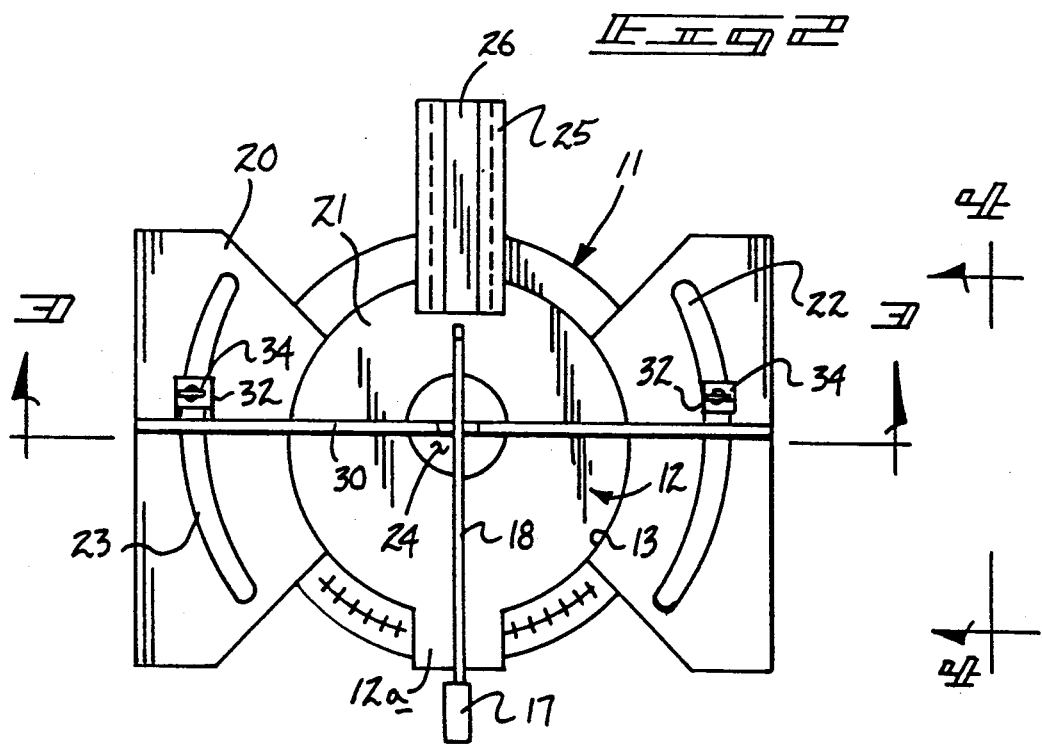
FIG. 2 is an orthographic view, taken along the lines 2—2 of FIG. 1 in the direction indicated by the arrows.

More specifically, the miter saw apparatus 10 of the instant invention essentially comprises a saw table base plate 11, including a cylindrical rotary table 12 pivotally mounted medially of the base plate 11 received within a base plate cylindrical stepped recess 13 (see FIG. 2). A rotary saw 14 is mounted above the rotary table 12, including a rotary saw blade 14a. The rotary saw 14 is mounted to a first support plate 15 that in turn is orthogonally mounted to a second support plate 16 to define an "L" shaped configuration. A third plate 16a in turn is slidably and guidably mounted within a dovetail groove 26 of a guide base 25 that is fixedly mounted to the rotary table 12. The further second plate 15 accordingly includes a dovetail guide complementarily received within the dovetail groove 26 to slidably guide the rotary saw 14 diametrically along the rotary table 12, with the saw blade 14a received within a rotary table saw slot 18 diametrically directed through the rotary table 12. A lock lever 17 directed through the base plate 11 effects selective latching in a frictional clamping engagement of the rotary table 12 relative to the base plate 11 in a conventional manner of a type as exemplified in U.S. Pat. No. 4,934,233 incorporated herein by reference.

The rotary table 12 is rotatably mounted through an arc of forty-five degrees, with a rotary table abutment 12a projecting radially and exteriorly of the rotary table in diametrical alignment relative to the guide base 25. The abutment 12a is positioned between adjacent surfaces of the base plate 11 below a base plate top wall 20. It should be noted that the rotary table 12 includes a rotary table top wall 21 arranged in a coplanar relationship relative to the base plate top wall 20.

Figure 3:
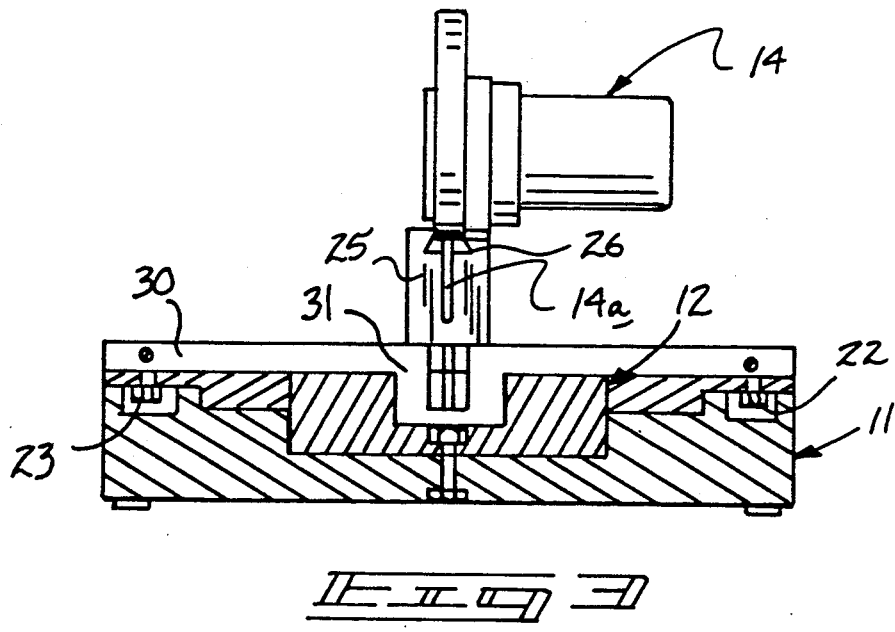
FIG. 3 is an orthographic view, taken along the lines 3—3 of FIG. 2 in the direction indicated by the arrows.
Figure 4:
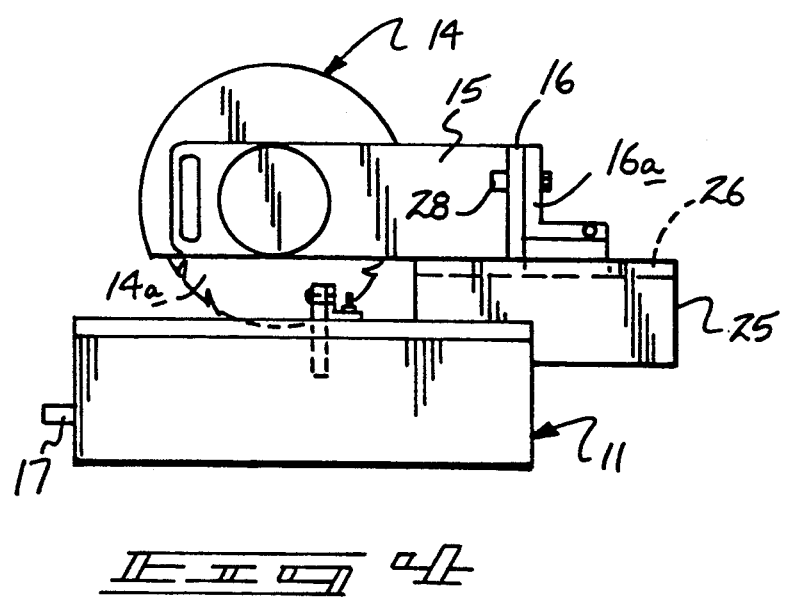
FIG. 4 is an orthographic view, taken along the lines 4—4 of FIG. 2 in the direction indicated by the arrows.

First and second respective arcuate slots 22 and 23 are concentrically mounted relative to the rotary table and directed into the base plate top wall 20 on diametrically opposed sides of the rotary table 12. Each slot defines forty-five degrees of arc and is oriented ninety degrees relative to the base plate table recess receiving the rotary table abutment 12a. In this manner, the saw blade may be adjusted to cut a workpiece in a range from zero to ninety degrees, wherein such workpiece is directed along an associated guide fence 30. The rotary table 12 includes a rotary table bore 24 receiving a "U" shaped central fence recess portion 31 positioned medially of the elongate guide fence 30 that includes locking lugs 32 mounted to opposed sides of the fence, wherein each of the locking lugs receives a locking guide boss 33 therethrough (see FIG. 6), wherein each of the locking boss guides 33 are received within a respective arcuate slot 22 or 23 utilizing a fastener 34 to selectively secure the fence in an angular orientation relative to the first or second arcuate recess 22 and 23. A head portion of each of the locking boss guides 33 is received within a respective arcuate recess, in a manner as illustrated in FIG. 3 for example.

It should be noted that the saw structure 14 is angularly oriented relative to the rotary table as the third plate 16a includes an alignment lug 28 projecting through an arcuate groove 29 within the second plate 16, wherein the second plate is pivotally mounted about a pivot axle 27. Fastening of the second plate relative to the further second plate may be effected in a conventional manner utilizing various fasteners as required.

Figure 7:
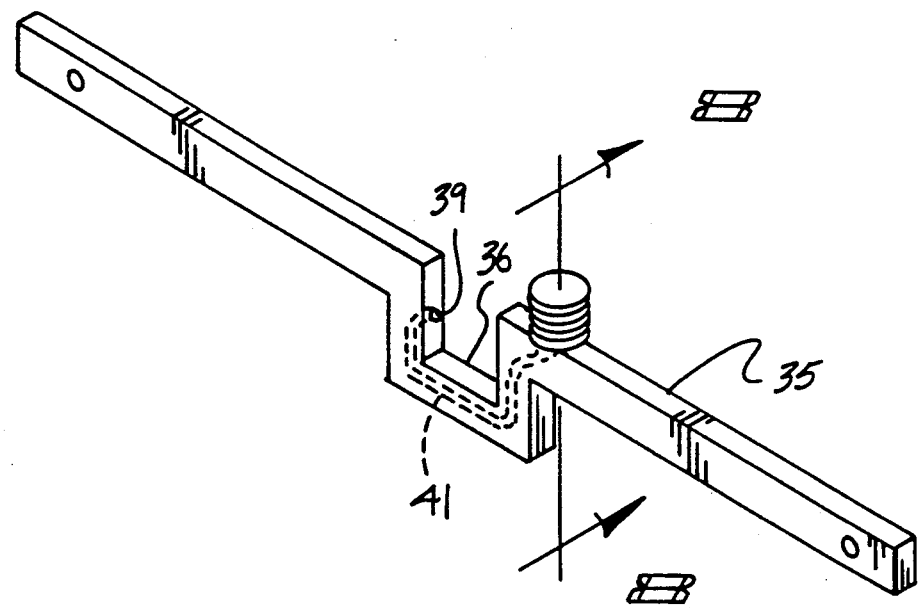
FIG. 7 is an isometric illustration of a modified saw fence guide structure.
Figure 8:
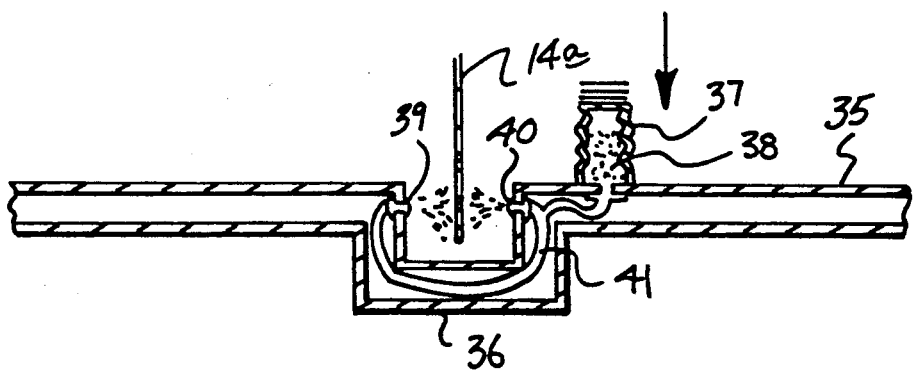
FIG. 8 is an orthographic view, taken along the lines 8—8 of FIG. 7 in the direction indicated by the arrows.

As illustrated, the guide fence 30 and the "U" shaped central fence recess portion 31 received within the rotary table bore 24 may be formed in a modified form to define a modified guide fence 35, as illustrated in the FIGS. 7 and 8. The modified guide fence 35 is formed of a hollow configuration, including a central "U" shaped fence recess 36 received within the rotary table bore 24. A bellows 7 mounted to the guide fence 35 is filled with a graphite mixture 38 and the bellows 37 in turn is in communication with respective first and second nozzle 39 and 40 mounted on opposed sides of the "U" shaped fence recess 36 and simultaneously on opposed sides of the saw blade 14a, whereupon actuation of the bellows directs the graphite mixture 38 through a feed conduit 41 within the modified guide fence 35 to direct the graphite mixture through the first and second nozzle 39 and 40 and place the mixture upon the saw blade 14a to lubricate the saw blade to permit ease of cutting of a workpiece.

As to the manner of usage and operation of the instant invention, the same shall be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A miter saw apparatus, comprising,
    a saw table base plate, the saw table base plate including a cylindrical rotary table mounted within the rotary base plate medially thereof, wherein the base plate includes a base plate stepped cylindrical recess complementarily receiving the rotary table therewithin,
    and
    a rotary saw slidably mounted above the rotary table, wherein the rotary saw includes a rotary saw blade, the rotary table includes a rotary table saw slot receiving the saw blade therethrough,
    and
    a guide fence diametrically directed across the rotary table and received on the saw table base plate, wherein the saw table base plate includes a base plate top wall, and the rotary table includes a rotary table top wall, wherein the rotary table top wall and the base plate top wall are coplanar, and a guide base projecting rearwardly and fixedly mounted to the rotary table aligned with the rotary table saw slot, wherein the guide base includes a groove diametrically aligned with the rotary table saw slot, and the rotary saw fixedly secured to a first support plate, the first support plate orthogonally and fixedly mounted to a second support plate, and the second support plate adjustably mounted relative to a third plate, the third plate including a guide, wherein the guide is slidably received within the groove, and the second support plate includes a pivot axle directed through the second support plate and received orthogonally within the third plate to pivotally mount the second support plate relative to the third plate, and the third plate including an alignment lug fixedly mounted to the third plate, and wherein the second support plate includes an arcuate groove and wherein the alignment lug is received within the arcuate groove to pivotally guide the second support plate relative to the third plate.

2. An apparatus as set forth in claim 1 wherein the guide fence includes a "U" shaped central recess, and the rotary table includes a rotary table central bore, wherein the "U" shaped central recess is received within the central bore, and the "U" shaped central recess includes a first nozzle and second nozzle in confronting relationship relative to one another on opposed sides of the recess, and wherein the rotary saw blade is received within the central "U" shaped recess between the first nozzle and the second nozzle, and wherein the guide fence is hollow and includes a feed conduit in communication with the first nozzle and the second nozzle, and the feed conduit in further communication with a bellows, the bellows including a graphite mixture whereupon deflection of the bellows directs the graphite mixture onto opposed sides of the rotary saw blade when positioned between the first nozzle and the second nozzle.

* * * * *